Dec. 23, 1958 T. BODDE 2,865,172
ROTARY REACTION ENGINE
Filed April 5, 1955 3 Sheets-Sheet 1
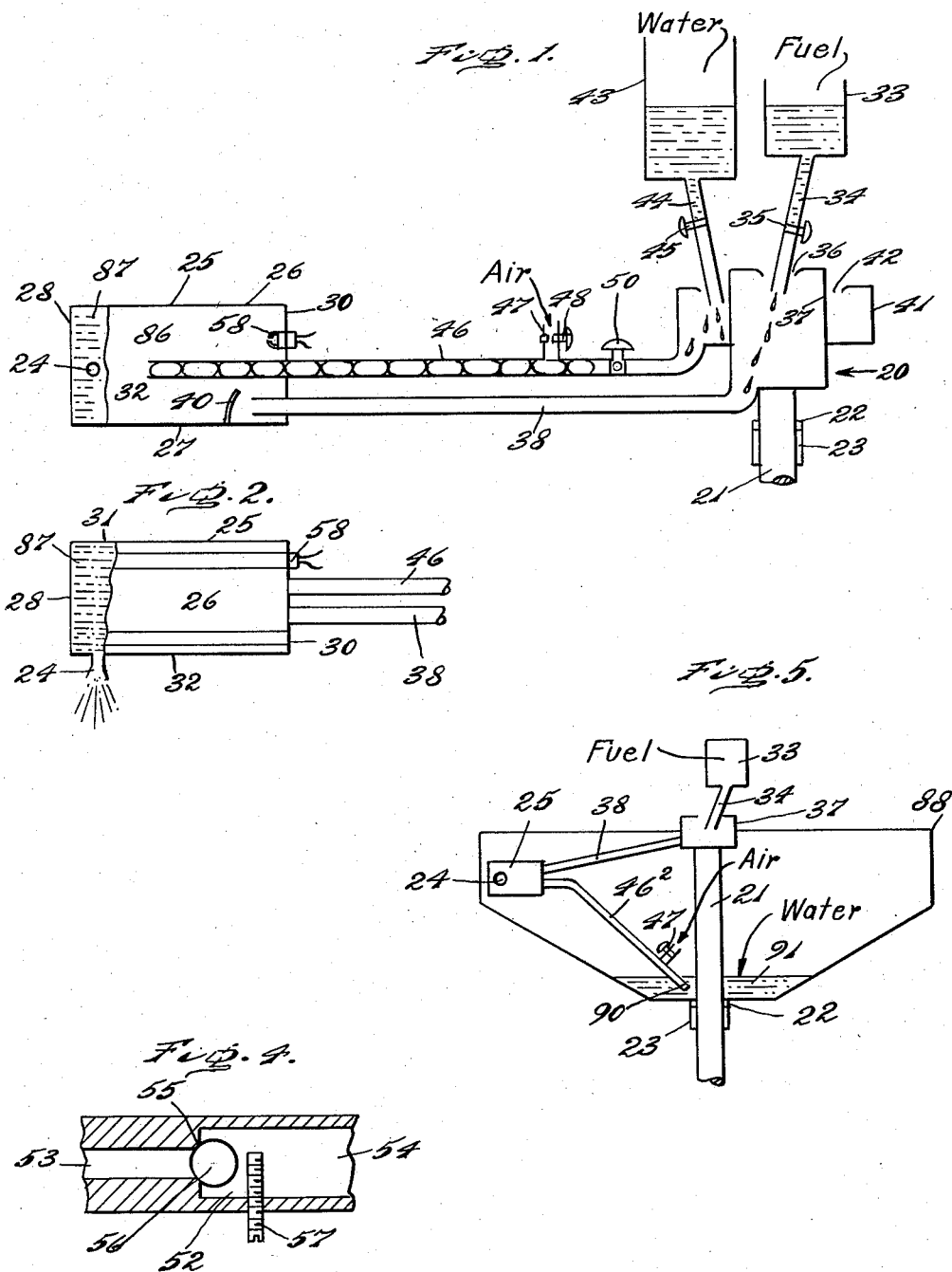
INVENTOR
Theodore Bodde

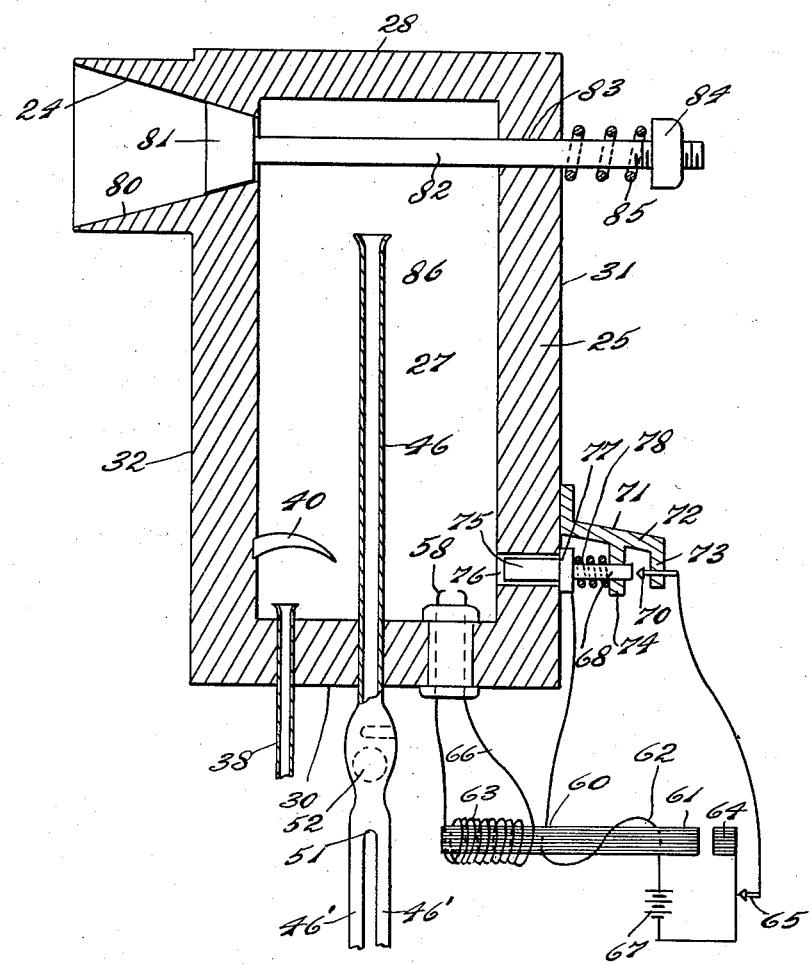

Dec. 23, 1958 T. BODDE 2,865,172
ROTARY REACTION ENGINE
Filed April 5, 1955 3 Sheets-Sheet 3

INVENTOR
Theodore Bodde
BY
ATTORNEYS.

United States Patent Office 2,865,172
Patented Dec. 23, 1958

2,865,172

ROTARY REACTION ENGINE

Theodore Bodde, Philadelphia, Pa.

Application April 5, 1955, Serial No. 499,417

10 Claims. (Cl. 60—39.34)

The present invention relates to water spout jet engines. The present application is a continuation in part of my copending application Serial No. 343,355, filed March 19, 1953, for Water Spout Jet Engine, now abandoned.

A purpose of the present invention is to increase the reaction of a jet rotor by feeding water as well as fuel and air to the jet and thereby increasing the inertia of the fluid expelled by the jet.

A further purpose is to pump air to a jet by water supplied under pressure and entraining the air.

A further purpose is to pump the fuel and also the water and entrained air to a combustion chamber behind the jet under the centrifugal force of rotation.

A further purpose is to dry the air and separate it from the water by centrifugal force in the combustion chamber.

A further purpose is to obstruct the discharge of fluid through the jet opening by water accumulating near the side remote from the axis of the combustion chamber and thus increase the torque of the engine.

A further purpose is to atomize the fuel in the combustion chamber by squirting it against a deflecting surface and thus intimately mix the fuel with the air.

A further purpose is to prevent the return of fluid flowing to the combustion chamber by locating a check valve or check valves in the feeding tube or tubes.

A further purpose is to close the jet opening by a valve which will not open until a substantial superatmospheric explosive pressure is built up in the combustion chamber.

A further purpose is to trigger ignition by a pressure switch responding to the build-up of pressure in the combustion chamber.

A further purpose is to expand the gases passing through the jet by nozzle effect.

A further purpose is to at least partially recover the water passing through the jet and recirculate the water from a tank.

A further purpose is to provide leakage from the combustion chamber even when the valve is closed, in order to allow better escape of exploded gases even after the valve is closed and in order to prevent the combustion chamber from wholly filling with water and remaining filled by some accident.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

Figure 1 is a diagrammatic central vertical section showing the jet engine of the invention, with the outside portion of the combustion chamber being illustrated in elevation.

Figure 2 is a fragmentary top plan view of the combustion chamber of Figure 1 with the chamber wall near the outside broken away.

Figure 3 is a fragmentary enlarged central horizontal section through the combustion chamber showing the structure in considerably more detail than that illustrated in Figures 1 and 2.

Figure 4 is a fragmentary longitudinal section through a check valve which may be used in the preferred embodiment.

Figure 5 is a diagrammatic vertical section of a variant form of water spout jet engine in accordance with the invention.

Figure 3A:
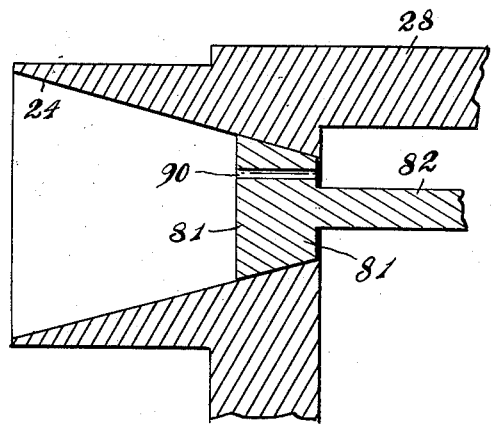
Figure 3a is a fragmentary axial section of a modified form of valve showing a leakage opening through the valve.

Describing in illustration but not in limitation and referring to the drawings:

Jet engines in which a rotor is turned by the reaction of a jet directed from the rotor in a direction opposite to the direction of rotation are applicable not only to vehicles such as aircraft, but have many other applications, including stationary engines which can be employed in comparatively primitive civilizations, such as that in China, and are also applicable at remote locations, as on farms, and in mining, forestry, and similar equipment. In most engines of the character, fuel is burned in air and expelled through the jet, the torque depending upon the inertia of the gases.

The present invention is concerned particularly with increasing the inertia and thus increasing the torque by supplying water as well as fuel and air to the jet. Water is thus expelled through the jet either as liquid water or as steam, in either case greatly augmenting the inertia, and increasing the reaction.

In the preferred embodiment of the invention, water is used to solve the problem of pumping the air, the water being carried outward by centrifugal force and entraining air through an aspirator or the like so that the water carries bubbles of air out to the jet. In the combustion chamber of the jet a separation takes place due to the greater mass of the water per unit of volume, the water being thrown to the farther end of the combustion chamber and the air thus being dried and prepared for combustion. Fuel is preferably atomized in the combustion chamber and mixes intimately with the air. When combustion takes place under explosive conditions, water is expelled through the jet, which is advantageously located near the farther end of the combustion chamber where the water collects. Obstruction of the jet by the water is desirable to increase the reaction from the jet.

The discharge through the jet is desirably further impeded by a valve which requires building up a predetermined pressure in the combustion chamber before discharge. The combustion occurs from an ignition device which is preferably triggered when a predetermined pressure is built up in the combustion chamber.

It is desirable in the preferred embodiment to provide leakage even when the valve is closed, in order to more effectively clear gases from the previous combustion and to avoid the possibility that the combustion chamber may wholly fill with water and remain filled due to some accident.

The device may be employed in a tank in which a portion of the water is recovered for reuse.

Considering first the form of Figures 1 and 2, a rotor 20 is mounted on a suitably vertical shaft 21 having a thrust collar 22, and journalled on a combined journal and thrust bearing 23. The rotor is free to turn, and of course will be provided with suitable structural supports, not shown, for the mechanism thereon.

Near the outside or circumference of the rotor is located a jet opening 24 directed in the direction opposite to that in which the rotor is intended to turn, and desirably formed in the wall of a combustion chamber 25. While in the particular installation only one jet and combustion chamber are shown, it will be understood that any desired number of jets and combustion chambers can be located around the rotor in the same bank or in a series of banks, as well known in the art.

The combustion chamber is conveniently rectangular, having a top 26, a bottom 27, an outer wall 28, an inner wall 30, a forward side 31 and a rearward side 32. In the embodiment shown which is the preferred form, the radial dimension is considerably longer than the dimension circumferentially or the dimension vertically.

Any suitable fuel feed supplies such as gasoline, kerosine, fuel oil or the like to the combustion chamber. When the axis is vertical a very convenient fuel feed consists of a fuel tank 33 having a discharge pipe 34 controlled by a valve 35 and dripping fuel at an adjusted rate through an opening 36 in the top of a fuel cup 37, desirably of circular cross section, conveniently located near the center of the rotor and having near the bottom at the outside of the cup a fuel tube 38 discharging into the combustion chamber through the inside wall 30. The fuel tube conveniently ends immediately inside the combustion chamber in line with an atomizer baffle 40 against which the fuel is projected under high pressure from the centrifugal force to atomize the fuel and cause it to mix readily with the air as later explained.

Surrounding and separate from the fuel cup 37 is a water cup 41, desirably of circular cross section, having a ring-like opening 42 near the top. Water is fed from a water tank 43, which like the fuel tank can suitably be stationary, through a discharge pipe 44 controlled by a regulating valve 45 into the water cup 41. Near the bottom and outside of the water cup a water discharge pipe 46 carries the water out to the combustion chamber, entering through the inner wall 30, and desirably extending well outward in the combustion chamber to a point beyond the outer end of the fuel pipe 38 so that the water will not be directed against the baffle 40. As the water passes outwardly through the pipe 46 it passes a suitably upwardly directed aspirator opening 47 through which air is sucked in and entrained as bubbles with the water. A valve 48 controls the amount of entrained air. A valve 50 in pipe 46 desirably provides further control over the flow of water. Because the pumping action due to air entrainment works best in small tubes, it will be desirable to use two or more tubes 46' as shown in Figure 3 joining at 51 before entering the combustion chamber, but each having a separate air entrainment inlet 47.

It is quite likely, especially in the larger sizes of water spout jet engine, that the pressure build-up in the combustion chamber will be considerable and may tend to cause regurgitation through the inlet pipes notwithstanding the centrifugal force. In such cases it is desirable to employ a check valve 52 which closes against reverse flow but normally opens outwardly. In Figure 3 the check valve is shown located in the water and air inlet pipe beyond the joining at 51 of the branches. It is equally applicable to the fuel inlet pipe if desired. The check valve of the preferred type is shown more in detail in Figure 4, where the passage 53 is directed inwardly and the passage 54 is directed outwardly, the check valve consisting of a seat 55 against which a ball 56 moves in case of tendency toward regurgitation. The screw stop 57 prevents the ball 56 from moving too far away from its seat in normally open position.

The fuel in the combustion chamber is ignited by an ignition device, suitably a spark gap 58 although alternatively an exposed incandescent filament such as platinum may be employed. While the spark gap may operate continuously or substantially so, the spark gap is preferably pressure actuated as shown in Figure 3. In this case a sparking transformer 60 has a core 61, a primary 62, a secondary 63 and a vibrator 64 having a vibrator contact 65. Leads 66 connect the secondary of the sparking transformer to the spark gap. A pressure switch closes the circuit consisting of a source, suitably a battery or generator 67, in series with the primary 62, the movable contact 68 of the pressure switch, the fixed contact 70 of the pressure switch and the vibrator switch 65. The pressure switch 71 consists of a bracket 72, having an arm 73 which mounts the fixed contact and an arm 74 which guides the movable contact, consisting essentially of a plunger, and having on its end a piston 75 extending through an opening 76 into the wall of the combustion chamber, and having a flange 77 which normally closes the outside of the opening. A spiral compression spring 78 around the plunger-like movable contact acts between the bracket 74 and the flange 77 to urge the pressure switch into its normal open position.

In the form of Figure 3, the jet opening 24 has nozzle walls 80 which desirably conform to the requirements for substantially fully expanding the gas expelled and lowering its temperature as far as possible toward room temperature, to utilize as much as possible of the heat in reaction energy. In the preferred embodiment the orifice is not continuously open, but is closed by a valve 81 suitably of cone formation closing in the jet opening, and having a stem 82 which passes through an opening 83 in the forward wall of the combustion chamber, and carries a nut 84 threaded on the forward end. A spiral compression spring 85 around the stem acting between the nut 84 and the forwarding wall 31 urges the valve toward closure. It will, however, be understood that the valve 81 is optional and the device is operative without the use of the valve.

It is preferable to provide for leakage from the combusion chamber even when the valve is closed. This leakage should be small and desirably adjustable and for best results should be located at a position adjacent the valve position and preferably take place through the valve either by preventing the valve from fully closing or providing a leakage port through the valve itself.

Figure 3B:
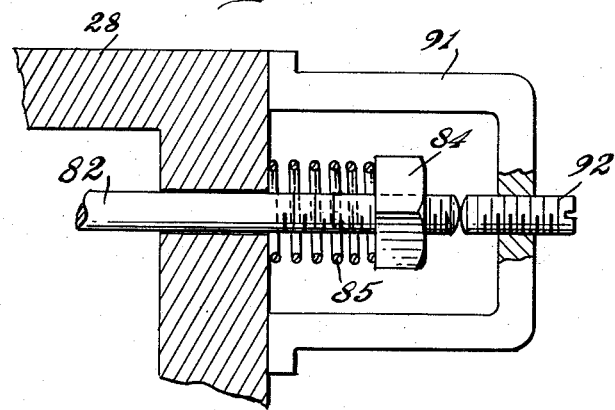
Figure 3b is a modified axial section of a still further modification in the construction of the valve of Figure 3.

Thus in Figure 3a the valve 81 is provided with a port 90, suitably a drill hole through the valve itself. In Figure 3b the outer end of the valve stem 82 is surrounded by a housing 91 which carries an adjustment screw 92 axially in line with the valve stem and impinging on the outer end of the valve stem when the valve closes to act as a stop. The adjustment screw is set at a position which prevents full closing of the valve, the valve being open desirably just a "crack."

In operation of the embodiments of Figures 1, 2 and 3, the device is normally not self-starting, but may be started in any suitable way, as by an electric self-starter driving the shaft 21. Centrifugal force then throws the fuel discharge in the cup 37 from the fuel tank 33 outwardly through the pipe 38 under considerable pressure so that the stream of fuel impinges against the baffle 40 in the combustion chamber 86 and is atomized.

In the meantime water from tank 43 passes into the cup 41 and is thrown outwardly under high pressure from centrifugal force through the pipe 46 or the pipe branches 46', passing through the open check valve if a check valve is used. As the water passes by the aspirator air inlet 47, air bubbles are drawn in and entrained by the water, being projected at the outer end of pipe 46 into the combustion chamber. Once the mixture of water and entrained air enters the combustion chamber, the water is thrown outwardly by the centrifugal force and collects at 87 near the jet opening, while the air is thus dried and remains radially inward of the water, where it mixes with the atomized fuel.

If the ignition device is operating substantially continuously, as soon as a combustible mixture builds up an explosion occurs in the combustion chamber and expels the combustion mixture along with an increment of water through the jet opening. This gives the normal reaction from the combustion mixture, but it also gives a greatly increased reaction from the added inertia due to the presence of the water. If the jet opening has a nozzle formation which expands the gases and cools them as shown, the jet evolving may convert a large part of its heat into reaction energy.

In case the device employs the valve 81 of Figure 3 in the jet opening, the pressure of the exploding mixture must build up high enough to open the valve, and the gases as well as the accumulation of water will obstruct the free flow of the explosion mixture, thus increasing the reaction force. The valve 81 thus acts to increase the pressure build-up in the combustion chamber and also as a safety or relief valve.

In the preferred embodiment shown in Figure 3, the explosion will not occur until the pressure build-up in the combustion chamber from centrifugal force is sufficient to close the pressure switch 71 and energize the spark gap 58, at which time ignition will occur. Thus in any case there will be a series of explosions in the combustion chamber, which not only expel the combustion mixture but expel the water which increases the inertia, as well as pumping the air.

It will be evident that using the valve of Figure 3a or 3b, the effect of the leakage port through the valve or between the valve and the valve seat will be to permit more effective clearing of exploded gases even after the valve has closed. Exit from the combustion chamber will substantially stop as soon as the water inside the combustion chamber reaches the leakage port, since the frictional drag of the walls of the very small port on the water will prevent large quantities of water from discharging. This slight water expulsion is, however, desirable to restore operation of the device in case, through some accident, the combustion chamber should become wholly filled with water.

It will, of course, be understood that the radius of the rotor and its speed of rotation will effect the centrifugal force developed in pumping the fuel, water and air, and these factors will be varied in the design to obtain the most advantageous operation. It will also be understood that the question as to how far the water will be vaporized into steam will depend upon the temperature attained by the walls of the combustion chamber. The vaporizing of steam, however, tends to cool the walls and one of the advantages of the invention is that a combustion chamber can be made from a comparatively inexpensive alloy, and does not in many cases require the very expensive heat resisting materials.

It will be understood that the water passes out through the jet opening much the way a projectile is shot from a gun.

In some cases, especially where large supplies of water are not available, it is best to recover the water at least partially and also protect the user against the discharge from the jet. In Figure 5 the shaft 21 carries a thrust ring 22 and is journalled on a bearing 23 located below the bottom of a desirably stationary tank 88. Any desired packing gland or seal may be provided for the tank around the shaft. The combustion chamber 25 is within the lateral confines of the tank, and the fuel feed will desirably be substantially the same as that shown in Figures 1 and 2.

In this case, however, the water and air feed is accomplished differently. A water feed pipe $46^2$ at its lower end 90 is immersed beneath the surface of a pool of water 91 in the bottom of the tank. The aspirator inlet 47 is provided in the water pipe $46^2$ above the water level and the water pipe extends outwardly to the inside of the combustion chamber as in the other forms.

Thus in this case water discharge through the nozzle is to a considerable extent collected in the pool 91 and recirculated. At the same time the discharge from the nozzle is directed against the inside of the tank, preventing the possibility that the discharge through the nozzle may be annoying or harmful to the user.

It will be evident that the depth of the pool 91 in the tank 88 can be increased so that reaction will occur against the water in the pool, and provided the aspirator inlet is kept above the water level the water can actually be above the level of the combustion chamber to increase the reaction by the jet, and also increase the recovery of water going through the jet and further cool the combustion chamber. Only the lower part of the device is below the water level in this case.

Aside from the features just mentioned, the device of Figure 5 will conveniently operate in the same way as the other forms.

In view of my invention and disclosure variations and modifications to meet individual whim or particular need will doubtless become evident to others skilled in the art, to obtain all or part of the benefits of my invention without copying the method and apparatus shown, and I therefore claim all such insofar as they fall within the reasonable spirit and scope of my claims.

Having thus described my invention what I claim as new and desire to secure by Letters Patent is:

1. In a jet engine having water flow, a rotor, a combustion chamber mounted on a rotor at a position disposed radially outwardly from the axis and having walls forming a jet opening in the chamber near the radially outer end thereof disposed in the trailing direction, outwardly opening valve means in the jet opening, leakage means from the combustion chamber operative even when the valve is closed, means for biasing the valve means toward closure, means for forcing a dispersion of water and air into the combustion chamber at a position adjacent the radial outer end of the chamber, said dispersion being under pressure continuously applied to the combustion chamber, means for forcing a stream of fuel into the chamber at a position located radially inwardly of the point of entry of the dispersion of water and air, said stream of fuel being constantly in communication with the chamber, means for atomizing the fuel in the chamber before it moves outwardly to the point of entry of the dispersion of water and air, whereby the dispersion of water and air is separated by centrifugal force in the chamber, the water collects toward the outside and the air toward the inside and the atomized fuel is projected into the air, and intermittent ignition means for exploding the mixture of air and atomized fuel, whereby the explosion occurs intermittently, opens the valve, and discharges slugs of water first and then products of combustion.

2. A jet engine of claim 1, having a baffle interposed at a position radially outside the point of introduction of the fuel into the combustion chamber and radially inside the point of introduction of the dispersion of water and air into the combustion chamber, on which the fuel is atomized by striking the baffle, the baffle deflecting the fuel toward the air.

3. A jet engine of claim 1, in which the jet opening is provided with means for obtaining adiabatic expansion of the exploding gases during expulsion of the water from the combustion chamber.

4. A jet engine of claim 1, in which the leakage means extends through the valve.

5. In a jet engine having water flow, a rotor adapted to turn about an axis, a combustion chamber mounted on the rotor near the outside and having a jet opening near the outside directed in the direction away from the direction of motion of the rotor, a valve in the jet opening outwardly under pressure, means for supplying a stream of fuel under pressure continuously applied to the combustion chamber, means for supplying water through a passage under pressure continuously applied to the combustion chamber, means for entraining air in the water, a spark gap in the combustion chamber, a sparking transformer having a primary and a secondary, the secondary being connected to the spark gap, a pressure actuated switch closing under pressure in the combustion chamber and a source of energy in circuit with the primary of the sparking transformer and the pressure actuating switch.

6. In a jet engine having water flow, a rotor adapted to turn about an axis, a combustion chamber mounted on the rotor having a jet opening near the outside extending in the direction away from the direction of motion, valve means for at least partially closing the jet opening, an igniter in the combustion chamber, a fuel feed extending to the combustion chamber under pressure continuously applied to the combustion chamber, a tank surrounding the rotor and having water in the bottom thereof, a water feed extending from the water in the tank outwardly to the combustion chamber under pressure continuously applied to the combustion chamber, and means in the water feed for entraining air in the water.

7. In a jet engine having water flow, a rotor adapted to turn about an axis, a combustion chamber mounted on the rotor having a jet opening near the outside extending in the direction away from the direction of motion, a pressure fuel feed extending to the combustion chamber and applying pressure continuously to the combustion chamber, a pressure water feed extending to the combustion chamber and applying pressure continuously to the combustion chamber, means for entraining air in the water of the water feed, valve means for at least partially closing the jet opening intermittently and an igniter in the combustion chamber.

8. A jet engine of claim 7, in combination with leakage means from the combustion chamber even when the valve means is closed.

9. In a jet engine, a rotor, a combustion chamber mounted on the rotor at a position disposed radially outwardly from the axis, walls in the combustion chamber provided with a jet opening near the radially outer end thereof disposed in the direction opposite to the direction of rotation, means for forcing a mixture of air and slugs of water into the combustion chamber at a position adjacent the radial outer end of the chamber, separate means for forcing a stream of fuel into the chamber at a position located radially inwardly at the point of entry of the mixture of air and slugs of water, whereby the mixture of air and slugs of water is separated by centrifugal force in the chamber, the water collecting toward the outside and the separated air toward the inside and the atomized fuel is projected into the separated air, and intermittent ignition means for exploding the mixtures of air and atomized fuel, whereby the explosion occurs intermittently and discharges an accumulation of water and then products of combustion through the jet opening.

10. A jet engine according to claim 9, in which the rotor is on a vertical axis, a tank surrounding the rotor and means for drawing water continuously from the tank to produce slugs of water for the engine.

References Cited in the file of this patent

UNITED STATES PATENTS

| 1,047,232 | Ivery | Dec. 17, 1912 |
| 2,164,225 | Walker | June 27, 1939 |
| 2,480,626 | Bodine | Aug. 30, 1949 |
| 2,716,997 | Crookston | Sept. 6, 1955 |

FOREIGN PATENTS

| 422,522 | France | Jan. 21, 1911 |
| 417,903 | Italy | Feb. 1, 1947 |